United States Patent Office 3,679,437
Patented July 25, 1972

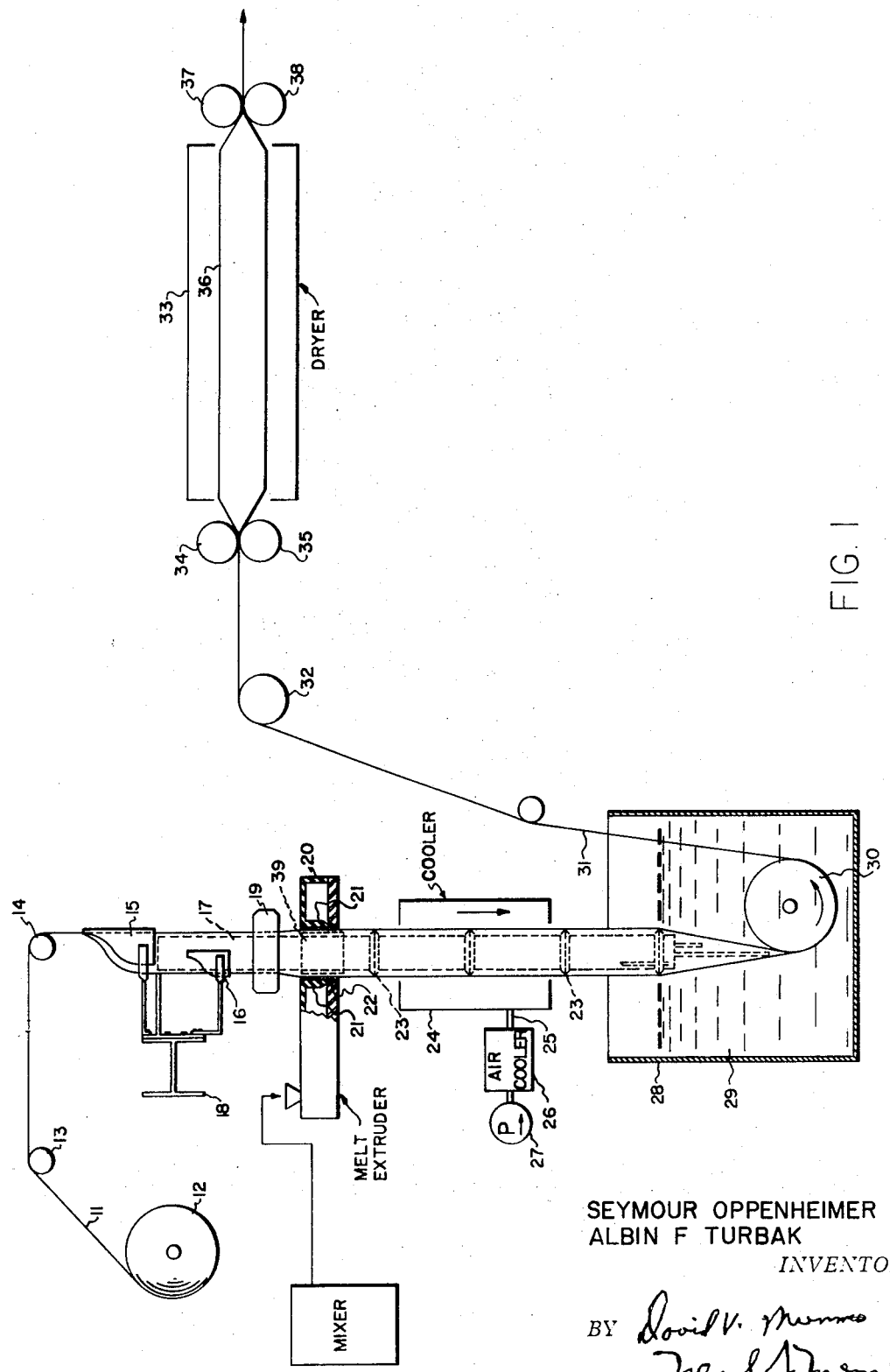

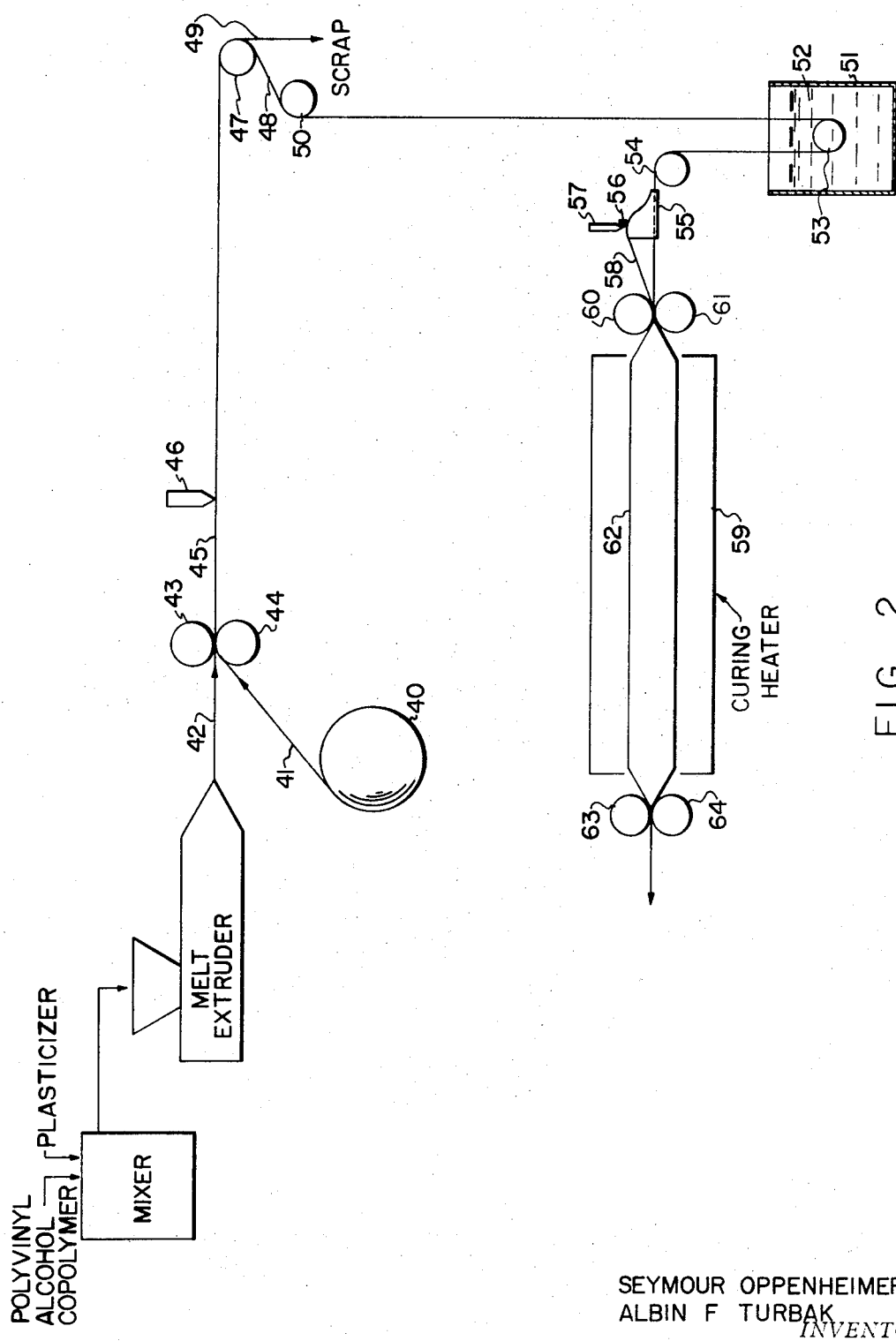

3,679,437
PREPARATION OF FIBROUS REINFORCED SAUSAGE-TYPE CASINGS FROM MELT-EXTRUDED POLYVINYL ALCOHOL RESINS
Seymour Oppenheimer, Chicago, and Albin F. Turbak, Danville, Ill., assignors to Tee-Pak, Inc., Chicago, Ill.
Filed May 26, 1969, Ser. No. 827,643
The portion of the term of the patent subsequent to Feb. 8, 1989, has been disclaimed
Int. Cl. A22c 13/00; C08f 3/34
U.S. Cl. 99—176
10 Claims

ABSTRACT OF THE DISCLOSURE

A novel fibrous casing for packaging sausages and similar products comprises a saturating tissue impregnated with a melt-extruded film of a polyvinyl alcohol resin. The casing is preferably prepared by melt extruding a plasticized, film-forming polyvinyl alcohol resin to form a film and, simultaneous with or subsequent to the extrusion step, impregnating and coating a saturating tissue with the extruded film. The resin film then may be, and preferably is, reacted with a suitable cross-linking agent, viz formaldehyde, to render it less sensitive to water and other solvents. Resin impregnated saturating tissue may be formed directly into a tubular casing or initially may be produced as a sheet which is slit to appropriate width and then formed into a tubular casing in a separate seaming operation. Casings are preferably formed using long fiber hemp papers as the saturating tissues and using film-forming polyvinyl alcohol resins having a hydroxyl group D.S. of at least about 60%, and more preferably in the range of from about 95% to about 99.99%.

BACKGROUND OF THE INVENTION

Field of the invention

This invention relates to new and improved sausage-type casings and the methods of preparing the same. More particularly, the invention is concerned with the preparation of casings for packaging sausages and similar products using melt-extrudable, film-forming polyvinyl alcohol resins. The invention is primarily directed to the production of novel fibrous casing comprising a tubular melt-extruded polyvinyl alcohol resin film reinforced with a fibrous web of saturating tissue, preferably a long fiber hemp paper tissue.

Natural casings are prepared from the intestines of various edible animals, primarily cattle, hogs, and sheep. The intestines are removed from the slaughtered animal and thoroughly cleaned by processes well known in the art. Natural casings, which have been thoroughly cleaned, are stuffed with various sausage meat compositions and formed into sausage links in preparation for cooking.

Prior to about 1925, substantially all sausage casings were natural casings prepared from animal intestines. Since that time, there have been developed several types of synthetic sausage casings. Some artificial sausage casings are prepared by reconstitution of a tubular film from animal hide fibers to yield a tough collagenous film. The major proportion of artificial casings, however, are prepared from regenerated cellulose, preferably by the viscose process, although some casings are manufactured by the cuprammonium process and also by denitration of extruded cellulose nitrate tubes.

There has been a considerably consumer acceptance of presliced sausages, such as bologna, salami, etc., which are sold in the form of relatively small conveniently sized packages, each package containing a small predetermined quantity of sausage in the form of a fixed number of slices. The reason for this is that the slicing of the sausage is performed mechanically, thus yielding a product of uniform thickness for ease of packaging. In order to provide a predetermined number of slices in a package of a given weight, it is essential that the diameter of the sausage be carefully controlled. In the preparation of sausages by the meat packer, a sausage emulsion is inserted into the sausage casing which is subsequently tied off at each end and cooked or cooked and smoked. In order to assure uniformity of size of the sausage slices, casings are provided to the trade known as fibrous casings. Fibrous casing is composed of cellulosic fibers, preferably in the form of a saturating tissue paper, which are impregnated and held together by regenerated cellulose. The paper used, preferably a long fiber hemp paper, is impregnated with viscose, formed into a tube, and treated in a coagulating and regenerating bath to regenerate cellulose within and upon the paper. The product is a fiber reinforced regenerated cellulose casing having relatively high strength and relatively low stretch.

Over a period of many years, cellulose casings have remained the most desirable and generally the most economical, in spite of the development of competing, cheaper plastics, because cellulose has properties of strength, both wet and dry, low stretch, and permeability to moisture vapor and smoke, which are required in the processing of sausage products. For example, some plastics, such as polyethylene, polyvinyl chloride, etc., which are easy to process in film form have never produced satisfactory sausage casings because of a deficiency in smoke or moisture vapor permeability. On the other hand, most other common plastic packaging films, including polyvinyl alcohol, while having the advantage of being easily formed into films which have a high moisture vapor and smoke permeability are too stretchy, particularly when wet, for use in forming sausage casings. For polyvinyl alcohol films, for instance, a stretch of up to 700% at break load, when wet, is typical.

STATEMENT OF OBJECTS AND FEATURES OF THE INVENTION

It is, therefore, one object of this invention to provide a new and improved sausage casing constituting a fibrous reinforced polyvinyl alcohol resin film and a method of preparing the same.

Another object of this invention is to provide a new and improved method for preparing polyvinyl alcohol resin sausage casings by impregnation of a saturating tissue fibrous web with a melt-extruded film of polyvinyl alcohol resin.

Another object of this invention is to provide a new and improved polyvinyl alcohol resin sausage casing having high strength and low stretch under rewet conditions.

A feature of this invention is the provision of a new and improved sausage casing comprising a tubular, fibrous-reinforced, melt-extruded polyvinyl alcohol resin film.

Another feature of this invention is the provision of a new and improved method for the direct preparation of fibrous-reinforced sausage casing by coating and impregnating a saturating tissue, preferably a long fiber hemp paper, formed into a tube with a melt-extruded film of polyvinyl alcohol resin and further insolubilizing the resin in and on the tissue tube.

Another feature of this invention comprises a new and improved method for the preparation of fibrous sausage casing wherein a saturating tissue is impregnated with a melt-extruded film of a polyvinyl alcohol resin, the resin is insolubilized in and on the tissue, and the tissue subsequently is formed into a tube.

Other objects and features of this invention will become apparent from time to time throughout the specification and claims as hereinafter related.

SUMMARY OF THE INVENTION

This invention comprises a new and improved sausage casing and method of preparing the same. A web of a saturating tissue, preferably a long fiber hemp paper, is impregnated and coated with a melt-extruded film of polyvinyl alcohol resin. Increased insolubility then may be, and preferably is, imparted to the deposited resin by reaction with a cross-linking agent, such as formaldehyde. If suitably slow reacting in the absence of a catalyst, the cross-linking agent may be present due to having been incorporated into the starting resin feed to the extruder. In such cases, cross-linking is triggered merely by contacting the extruded film with a suitable catalyst for the cross-linking reaction. The cross-linking agent generally is brought into contact with previously resin-impregnated tissue in a later and separate treating step. The polyvinyl alcohol-impregnated web directly may be formed into a tubular casing at the time of impregnation or, as a sheet, initially may be cut to desired width size and the narrower widths formed into tubular casings by a suitable adhesive seaming step. In carrying out this process, the extrudable resin employed is a suitably plasticized, film-forming polyvinyl alcohol resin having a hydroxyl (OH) group D.S. (degree of substitution—the ratio, expressed herein as a percentage, of the average number of hydroxyl groups in a particular resin per 100 monomeric units) of at least 60%, and preferably above about 95%, e.g., ranging up to and over 99.99%. The film-forming resins utilized typically further are characterized by a D.P. (degree of polymerization—an average of the total number of monomeric units per molecule in a particular resin) of at least about 800, and more preferably at least about 1000. The polyvinyl alcohol resins are rendered extrudable by incorporation thereinto of an effective amount, e.g., from about 5 to about 40%, of a plasticizer therefor, such as glycerol.

BRIEF DESCRIPTION OF THE DRAWINGS

FIG. 1 is a diagrammatic view showing the continuous coating and impregnation of a fibrous web with melt-extruded polyvinyl alcohol resin and direct formation of the same into a casing in accordance with this invention, and FIG. 2 is a diagrammatic view showing another embodiment of the method of the present invention wherein a fibrous web as a sheet is initially coated and impregnated with polyvinyl alcohol resin and the resultant film-impregnated sheet subsequently is formed into a tubular casing.

DESCRIPTION OF THE PREFERRED EMBODIMENTS

This invention relates to new and useful improvements in sausage casings. In the preferred embodiments of this invention, a plasticized, film-forming polyvinyl alcohol resin is melt-extruded and the extruded film is impregnated into and coated upon a fibrous web of saturating tissue, preferably a long fiber hemp paper.

The phrase, "extrudable, film-forming polyvinyl alcohol resin," as used herein, is intended to refer to film-forming vinyl polymers having a D.S. with respect to OH groups of at least about 60% and being of sufficiently high molecular weight to be melt-extrudable into self-supporting films. Vinyl alcohol, as a monomer, is not known to exist. All attempts to prepare vinyl alcohol have resulted in the rearrangement of the compound to acetaldehyde. Commercially, polyvinyl alcohol resins normally are prepared by hydrolysis of vinyl polymers containing vinyl aliphatic or aromatic ester units, including polyvinyl ester homopolymers, e.g., polyvinyl formate, polyvinyl acetate, polyvinyl propionate, polyvinyl butyrate, polyvinyl hexoate, polyvinyl benzoate, etc., and carboxylated polyvinyl ester polymers, e.g., those produced by copolymerizing a vinyl ester such as vinyl acetate, vinyl propionate, and vinyl benzoate with an ethylenically unsaturated carboxylic acid such as acrylic acid, methacrylic acid and maleic acid. The extent of the hydrolysis is controlled to produce products having the desired hydroxyl group degree of substitution. Polyvinyl alcohol resins so produced and preferred for use in the present invention have a D.S. with regard to OH group content in the range of from about 95% to about 99.99%, the latter figure approximating the maximum hydrolysis efficiency attainable in commercial practice. In the case of resins containing carboxyl groups, the invention contemplates the use of those having a D.S. with regard to carboxyl functionality ranging up to about 5%, preferably less than about 0.5%.

For purposes of this invention, it is necessary to use polyvinyl alcohol resins which are film-forming (e.g., D.P. is at least about 800) and having a D.S. of OH groups of at least about 60%. Such resins, as is known, typically have a viscosity of at least about 4 centipoises, e.g., in the range of from about 4 to about 65 centipoises and above, as 4% by weight aqueous solutions at 20° C. as conventionally measured on an Ostwald-Fenske Viscometer. Resins having such characteristics are suitably extrudable into films for impregnating the fibrous saturating tissue web and form ultimate films in and on the web having desired strength and moisture resistance properties. In general, solubility goes down while film strength increases with increasing molecular weight and OH group content. Film-forming resins having an OH group D.S. above about 95%, for example, can be extruded, when suitably plasticized, into films which are quite resistant to moisture even without cross-linking. Cross-linking, however, does render such and other resins stronger and less sensitive to water and, accordingly, cross-linking of the resin in the film is preferred in the present invention. On the other hand, extremely high molecular weight polyvinyl alcohol resins may present difficulties since resin melting point rises with increasing resin molecular weight. The preferred polyvinyl alcohol resins for use have melting points below about 220° C., e.g., in the range of from about 180° to about 215° C. Such resins typically have a D.P. in the range of from about 1000 to about 5000 and display a viscosity as 4% aqueous solutions, measured as described above, of less than about 45 centipoises. The more preferred of such resins furthermore are substantially uniform polymers, completely melting within a 10° C. temperature range.

Extrusion of the polyvinyl alcohol resins into films in the present invention requires that the resin be suitably and effectively plasticized. This allows extrusion to be carried out at temperatures below those at which the resin is thermally degraded (e.g., above about 240° C.) and also at melted resin viscosities which provide self-supporting, yet fibrous web-impregnating, extruded films. Preferred impregnation results, more specifically, may be obtained by effectively plasticizing the polyvinyl alcohol resin to produce at normal shear rates melt viscosities in the range of from about 100 to about 10,000 poises.

In general, any component or miture of substances which display a plasticizing action on polyvinyl alcohol resins are suitable for use as the plasticizer ingredient in the resins extruded in the present invention. The more effective polyvinyl alcohol resin plasticizers usually are humectant, water-soluble monomeric or polymeric alcohols, amines, or amides. Specific examples of suitable plasticizers include, without limitation, glycerol, ethylene glycol, propylene glycol, polyethylene glycols and polypropylene glycols having a molecular weight up to about 1000 (triethylene glycol, tripropylene glycol, Carbowax 200; Carbowax 400, Carbowax 600, etc.), trimethylol propane, sorbitol, formamide, urea, and polyoxyethylene ethers and esters containing from about 2 to about 20 moles of ethylene oxide per molecule, e.g., monophenyl ethers of polyoxyethylene containing 2-7 ethylene oxide units per molecule (e.g., Pycals), furfuryl alcohol ethers of polyoxyethylene containing 3–12 moles of ethylene oxide per molecule, and similar ethyloxylated derivatives of urea (Nopco GS–5), dimethyl formamide, trimethylol propane, etc. The more preferred plasticizers, such as the described polyoxyethylene derivatives, are those having normal (at 760 mm. Hg) boiling points above about 220° C.

The amount of plasticizer utilized in particular embodiments varies depending primarily upon the resin to be extruded and the extrusion conditions. Increased plasticizer levels in general are required with increasing resin molecular weight and lower extrusion temperatures and pressures. To produce suitable melt viscosities in the above described range, typical plasticizer levels are in the range of from about 5% to about 40%, more usually from about 15% to about 30%, by weight of the polyvinyl alcohol resin. Higher or lower plasticizer loadings may be employed, however, providing the resulting mixture is extrudable into self-supporting, substantially non-tacky films.

Due to the relatively high temperatures employed in the extrusion step in the present method, it is preferred that water (and other volatile substances) be essentially excluded from the resin mixtures to be extruded. When present in appreciable quantities, the water and similar volatile materials flash off, causing surface defects to be formed in the extruded film as it leaves the die. The more preferred embodiments, hence, select or pre-treat starting resin, plasticizer components, etc., to maintain moisture levels in resin mixture feed sto the extruder below about 0.5%, total weight basis.

In accordance with the present invention, plasticized polyvinyl alcohol resin may be heated and extruded into film and the film applied to a reinforcing fibrous web by any of a variety of well known techniques. The nature of the extrusion device is not crtical and any extrusion device designed and adapted to melt-extrude thermoplastic resins into films suitably can be used in the present invention. Typically, the operation is continuous and, in general, entails extruding a flat or tubular resin film having a temperature above the transition point of the resin, guiding the film into impregnating contact with a saturatable fibrous web, and lowering the temperature of the resultant so placed resin to result in the web being impregnated and coated with a continuous enveloping film of the resin. By initially forming the fibrous web into a tube and appropriately extruding the polyvinyl alcohol resin as a web-impregnating tubular film, tubular casings, as stated, may be formed directly in the present invention. In other instances, the extrusion and web-impregnation operations initially form only a flat sheet constituting the fibrous web impregnated and coated with a continuous polyvinyl alcohol resin film. The resultant flat sheets then are formed into tubular casings in a seaming operation using an adhesive for polyvinyl alcohol resins, such as aqueous and organic solvent solutions of polyvinyl alcohol resins, diisocyanates, epoxides, and the like.

Impregnation of the fibrous web by polyvinyl alcohol resin in the present invention results from the extruded polyvinyl alcohol resin film being maintained above the second order transition (i.e., softening) temperature of the particular resin (e.g., typically 5–10° C. below the melting temperature) until after it has been guided into the desired envelopment of the web. Some cooling of the extruded resin film, such as by contacting it with cooler fluids (e.g., air) or cooler surfaces (e.g., chilled plates or rolls) is, however, contemplated for use and, indeed, may be preferred in embodiments utilizing the more elevated extrusion temperatures.

The necessary guiding of the extruded film in and onto the fibrous web can be accomplished by a variety of means. One approach entails passing a continuous web, while supporting it, closely adjacent the die from which the resin film is being extruded. The polyvinyl alcohol resin is directly extruded onto the web under sufficient pressure to effect the desired impregnation. This technique may be used, for example, to impregnate and coat fibrous web initially formed into a tube to directly produce casing by the present method.

In another approach, the desired placement of the extruded film may be achieved by extruding a polyvinyl alcohol resin film at a point removed from a fibrous web, guiding the web and softened resin film together so that their flat surfaces are in surface-to-surface contact, and then applying sufficient pressure, such as by passing the contacting web and film through an appropriately constricted opening defined between two spaced rigid members( e.g., the nip of two oppositely rotating rolls), to press the resin film into and through the fibrous web. This method usually is employed to produce resin-impregnated flat sheets which are subsequently converted into tubes, although it also can be employed in direct casing production.

Embodiments of the latter type immediately above are exemplified by the use in the present invention of modifications of the process broadly disclosed in U.S. Pat. No. 2,958,364. In such approaches a fibrous web is formed into a tube and passed to within the interior of a supporting, open-ended, usually cylindrical, mandrel. A tubular film of polyvinyl alcohol resin is formed within the interior of the fibrous web tube by conventional blow melt-extrusion techniques. Impregnation of the fibrous web by the resin film is effected by proper application of pressure, e.g., by maintaining the internal pressure within the blow-molded resin bubble at sufficiently high levels through an air line positioned in the die and communicating an outside source of variable air pressure with the interior of the film bubble.

After a fibrous web is resin-impregnated in accordance with the present method, the polyvinyl alcohol resin is cooled to temperatures below the second order transition point of the resin to set (i.e., insolubilize) the resin in the form of a continuous film enveloping the reinforcing web. The rate at which the deposited resin cooling may vary although it must be at least sufficiently rapid and immediate enough after contact of the web of the hot resin to prevent undesirable thermal degradation of the web material. The deposited resin cooling suitably can be carried out by indirect or direct means using any convenient cooling expedient including cooled inert fluids such as air or water, chilled surfaces, the fabric web itself, and combinations thereof. The desired cooling of the impregnated web may be effected in a treating zone in common with or separate from the zone in which impregnation of the web with extruded film is carried out. For example, one preferred resin cooling approach involves utilizing a chilled surface (or surfaces) to support or press the fibrous web during the resin film impregnation step whereby resin cooling is simultaneous with resin film impregnation.

As stated above, the polyvinyl alcohol resin-impregnated fibrous webs produced in accordance with the present invention may be, and preferably are, treated with a cross-linking agent which will react with and cross-link the polyvinyl alcohol resin in the film during autogenous or heat curing of the coated article to render the film upon and within the fibrous web more insoluble in and then less sensitive to water and other solvent. Where employed, the cross-linking agent can be applied in any conventional manner. A typical embodiment utilizes an aqueous or organic solution of a cross-linking agent and by means of a spraying, bathing, or other conventional coating technique applies the solution to a reinforcing web prior to resin impregnation and/or to a resin-impregnated web before or after the described resin-setting cooling step. Alternatively, a slow-reacting cross-linking agent such as an epoxide resin may be added to the system via the resin feed to the melt extruder and later triggered after formation of a resin-impregnated web by contacting the product with a suitable catalyst/accelerator (e.g., ammonia for an epoxide) for the cross-linking reaction.

Particular cross-linking agents contemplated to be applied to further insolubilize the polyvinyl alcohol film resin in the present invention include any bi- or polyfunctional agents capable of forming cross-links between molecules of polyvinyl alcohol resins. Specific examples of such materials containing two or more reactive functional groups per molecule include aldehydes such as formaldehyde, glutaraldehyde, glyoxal, etc.; polymethylol derivatives such as water-soluble formaldehyde-amine and formaldehyde-amide condensation products, e.g., dimethylol urea, trimethylol melamine, and liquid urea-formaldehyde resins; diisocyanates, such as the diisocyanate of dimerized linoleic acid, 4,4'-methylene bis(cyclohexyl isocyanate), etc.; diisothiocyanates, such as the diisothiocyanate of dimerized linoleic acid, 4,4'-methylene bis(cyclohexyl isothiocyanate), etc.; polyepoxides, such as butadiene diepoxide and the like; polyamide epichlorohydrin resin; acyl halides, such as adipoyl chloride, sebacoyl chloride, etc.; and polymeric ketenes, such as the diketene of dimerized linoleic acid. Where necessary or desirable, a catalyst, accelerator, and the like for the cross-linking agent may be added to the system via the resin melt, the cross-linking agent stream, a separate stream, etc. After the desired application of a cross-linking agent to or completion of a cross-linking agent/accelerator combination on the resin film, the resultant resin in the film then is cured to introduce cross-linkages and insolubilize the resin. Although curing at room temperature often is effective, heating preferably is utilized during the curing step to shorten treating times. Heating may be useful also to set a seaming adhesive, where one is employed, or to remove solvents used as vehicles for adhesives, cross-linking agents, etc.

In preparing casings in accordance with this invention, it is preferred to use a fibrous web comprising a saturating tissue formed of long hemp fibers bonded together with a suitable wet strength sizing agent, such as regenerated cellulose or an insolubilized polyvinyl alcohol resin of high OH group D.S., i.e., greater than about 80%. Other nonwoven webs, such as Yoshino paper, rice paper, paper formed of polyvinyl alcohol resin fibers, hemp, rayon, cotton and nylon; and woven fabrics such as muslin, marquisette, cheese cloth, organdy, and voile can be used. It should be understood that these fibrous webs are commercially available. The long fiber hemp paper (Dexstar paper) is generally preferred for reasons of maximum strength, ease of handling, and economy.

APPARATUS AND PROCESS FOR CASING PREPARATION

Referring to FIG. 1 of the drawings, there is shown a diagrammatic view of an apparatus for coating or impregnating a fibrous web and directly forming the same into a fibrous casing in accordance with this invention.

In FIG. 1, a ribbon of paper 11, preferably of the type described in U.S. Pat. No. 2,045,349 which is a long fiber hemp paper weighing in the range from 12–16 pounds per ream, depending upon the size and weight of casing being manufactured, passes from roll 12 over rollers 13 and 14 and around formers 15 and 16 which cooperate to form the paper into a longitudinal tube. The paper tube then proceeds downwardly and is guided and supported from within by a mandrel 17. Mandrel 17, which is preferably a hollow metal tube, e.g., a steel pipe, has an outside diameter slightly less than the size of the casing to be produced, e.g., 2–7 inches. The length of mandrel 17 is such, e.g., 10–15 feet, that the casing being produced is adequately supported against undesirable collapse and shrinkage during the forming operations and while the resin in the film is undergoing orientation. Mandrel 17 is suitably supported as shown here using an I-beam 18. The paper 11, now shaped into the form of a tube, continues downwardly over mandrel 17, through a ring member 19, and through a resin melt extrusion device 20. Ring member 19, usually formed of metal, has an outside diameter slightly larger than the diameter of the tube-shaped paper passing through it and functions to maintain the paper in tubular form until it reaches resin melt extruder 20.

Extruder 20 generally has a body portion, shown here only diagrammatically, through which plasticized resin fed thereto is advanced by suitable means such as a rotating single-threaded, constant-pitch polyethylene screw and heated in one or more stages to above its melting temperature. At its end adjacent the paper tube, the die portion of extruder 20 defines an annulus surrounding and through which the tube-shaped paper centrally passes. A continuous tubular film of resin issues from extruder 20 through an annular opening 22 located circumferentially of the inner wall 21 of the annulus of extruder 20. In some instances temperatures of resin exiting the die may be more closely regulated by supplementally heating or cooling the resin immediately adjacent die opening 22 such as at annular surface 22 by conventional heat exchange means, e.g., embedded coils and the like, not shown here. The extruded resin is flowable (i.e., above the second order transition temperature) and under sufficient pressure as it issues inwardly from extruder 20 and upon the surface of the paper tube to effect an impregnation and coating of the fibrous web with a continuous film of polyvinyl alcohol resin.

The impregnation and coating operation is aided by the web tube being supplementally supported from within in the zone immediate and adjacent to extruder 20 by a rigid ring member 39 having a diameter slightly larger than the casing to be prepared and which is shrunk onto or otherwise rigidly fitted around mandrel 17. A number of slip rings 23 which also are fixed, such as by shrinking, onto mandrel 17 at suitable intervals, e.g., three feet, function to keep the inside wall of the impregnated and coated web from scraping against mandrel 17 until the resin is suitably set.

After extrusion and placement of the polyvinyl alcohol resin film on the web, the web is cooled in a cooling chamber 24. The cooling medium employed is air which enters chamber 24 through an air cooler 26 at line 25 under the influence of blower 27. The cooling in chamber 24 accomplishes two purposes. One function is to preclude the material of the reinforcing paper web from being degraded by heat from the resin film. Cooling also lowers the temperature of the resin film in and on the web below the second order transition point to effect a setting of the deposited film.

Mandrel 17 extends into a container 28 containing a solution 29 of a cross-linking agent, such as formaldehyde. In container 28 the impregnated and coated web now in the form of a tubular fibrous casing picks up sufficient cross-linking agent for completion of the insolubilization of the resin in the casing during subsequent curing. Solution 29 optionally also may contain other adjuvants desired to be impregnated into the resin film such as accelerators for the cross-linking agent, additional amounts of plasticizer, dyes, antioxidants, etc.

By passage over a roll 30 located in the bottom of container 28 the tubular casing is collapsed into a ribbon 31 which is then suitably guided by a series of rollers to a drying and curing chamber 33. Through the cooperative effort of a series of rollers 34 and 35 located adjacent the entrance of dryer 33 and a similar series 37 and 38 at the dryer exit, in dryer 33 the casing contains a trapped "bubble" and is maintained in an inflated form 36 for a more uniform curing treatment and to guard against undesired shrinkage. The casing receives sufficient heat treatment in dryer 33 from conventional direct (e.g., hot air) or indirect (e.g., irradiation heat) heating means to cross-link and further insolubilize the polyvinyl alcohol resin film and produce a finished casing.

In the apparatus and operation of the embodiment of the present invention depicted in FIG. 2 of the accompanying drawings, a film-forming and melt-extrudable polyvinyl alcohol resin is suitably mixed with a plasticizer therefor, and the resultant plasticized resin mixture is melt-extruded in a conventional manner to form a substantially flat resin film 42. A web of saturatable paper fibers 41 is unwound from a storage reel 40 and guided into face-to-face surface contact with resin film 42. Resin film 42 at this point in the process has cooled somewhat but is still above the second order transition temperature of the resin mixture and hence is flowable when deformed. Reinforcing web 41 and resin film 42 in surface-to-surface contact are then passed through the nip of a pair of rollers 43 and 44 which exert sufficient pressure on the web-film laminate to force the polyvinyl alcohol resin into the pores of the fibrous reinforcing web and produce a resultant article 45 wherein the reinforcing web is impregnated and coated with a continuous film of the polyvinyl alcohol resin. One or both of rollers 43 and 44 are cooled by conventional means, not shown, so that desired cooling of the polyvinyl alcohol resin to protect the fibrous web material and to set the impregnated resin film may be effected simultaneous with the film impregnation operation.

Resin-reinforced sheet 45 then is slit and cut to the desired width for casing formation by a conventional knife means 46, and the excess is removed by suitable means, here depicted by a passage over a deflecting set of roller guides 49 and 50. The trimmed resin-resin-forced sheet 48 is then guided through container 51 holding a bath solution 52 of a cross-linking agent and any other adjuvants desired to be incorporated into the ultimate casing.

Fibrous-reinforced sheet 48 is guided out of bath by rollers 53 and 54 and passed over former 55 which is of the conventional type which folds and forms sheet 48 into the form of a tube. A conventional adhesive applicator 57 is positioned with respect to former 55 to co-operate therewith and apply adhesive 56 to the sheet as the edges are overlapped in the forming operation. The forming and adhesive-application operation thus forms a casing 58 having a continuous longitudinally extending and adhesively bonded seam.

Treatment and insolubilization of the casing is completed in a dryer 59 in which the casing is subjected to a curing heat treatment during which cross-linking of the polyvinyl alcohol resin and any needed setting of the adhesive are completed. For maximum efficiency and uniform results in curing heater 59, a "bubble" can be trapped within the casing and the casing maintained in an inflated form 62 by the cooperation of rollers 60 and 61 adjacent the dryer's entrance and rollers 63 and 64, at the exit. If the adhesive 56 employed in seaming the casing is slow-acting, inflation of the adhesive in heater 59, of course, may be desired to be omitted to avoid disrupting the seam. In addition to using fast-acting seaming adhesives, such problems can be eliminated by postponing the application and/or curing of the cross-linking agent until after a seamed casing has been formed and the seaming adhesive thereof is cured in a a separate heating step.

The following non-limiting examples are illustrative of the nature of this invention:

Example 1

One hundred parts by weight of a dry polyvinyl alcohol/polyvinyl acetate copolymer having an OH group D.S. of about 71% and having a 4% aqueous solution viscosity of about 11 centipoises at 20° C. are uniformly mixed with 20 parts by weight of Pycal 94, a polymeric plasticizer for polyvinyl alcohol which is a polyoxyalkylene phenolic ether containing an average of five ethylene oxide units per molecule. The moisture content of the mixture is less than about 0.1% by weight.

A ribbon of 15-lb. Dexstar long fiber hemp paper is removed from a storage roll and passed through an apparatus as shown in FIG. 1 and as described above. The paper is formed into a tube and polyvinyl alcohol copolymer is melt-extruded (exit temperature about 175° C.) through annular die 20 to saturate and coat the paper tube. Copolymer is applied at a rate corresponding to provide an impregnated and coated tube thickness of about 5–10 mils. The coated tube passes downward and is immediately cooled in cooler 24 by air circulating at about 15° C. The tube then passes into tank 28 where it is contacted with an aqueous solution comprising 1% formaldehyde and 0.2% lactic acid, the latter being a catalyst for the formaldehyde cross-linking agent. The tube then passes through dryer 33 where it is carried at temperatures ranging up to 140° C. to effect a thorough cross-linking and insolubilization of the film. After curing, the resultant casing is exposed to a humid atmosphere, as is conventional, to raise its moisture content to levels, e.g., 10–15% by weight, as is basis, at which flexibility and handling properties are improved.

The casing has greater break strength and displays significantly less elongation at break as compared to fibrous reinforced regenerated cellulose casing.

A polyvinyl alcohol copolymer fibrous casing prepared as described above, after soaking in hot water, is stuffed with a bologna emulsion, and then subjected to a normal cooking and smoking operation. There is no breakage of the casing observed and moisture and smoke penetration are about the same as a conventional fibrous cellulosic casing.

Examples 2–11

The general procedure of Example 1 is repeated to directly produce additional fibrous polyvinyl alcohol resin sausage casings, excepting the various polyvinyl alcohol resins and plasticizers shown in Table I are substituted for those described in Example 1.

TABLE I

| | Polyvinyl alcohol resin | | | Plasticizer | | Resin melt (exit) temp., °C. |
|---|---|---|---|---|---|---|
| Example | Formula | OH group D.S., percent | Visc.,[1] cps. | Ingredient | Amount added, parts by wt. | |
| 2 | PVA/PVAc [2] | 99.5 | 10 | Pycal 94 | 20 | 200 |
| 3 | PVA/PVAc | 99.5 | 10 | do | 10 | 205 |
| 4 | PVA/PVAc | 99.5 | 10 | Carbowax 400 [3] | 15 | 200 |
| 5 | PVA/PVAc | 98.0 | 12 | Pycal 94 | 15 | 195 |
| 6 | PVA/PVAc | 98.0 | 12 | Carbowax 300 [4] | 25 | 195 |
| 7 | PVA/PVAc | 95 | 9 | Pycal 94 | 10 | 200 |
| 8 | PVA/PVAc | 95 | 9 | {Pycal 94 / Triethylene glycol} | 10 / 5 | 190 |
| 9 | PVA/PVAc | 85 | 11 | Pycal 94 | 15 | 185 |
| 10 | PVA/PVAc | 70 | 12 | Glycerol | 30 | 175 |
| 11 | PVA/PVAc/PMAA [5] | 95 | 15 | Pycal 94 | 20 | 190 |

[1] As 4% aqueous solutions at 20° C.
[2] Polyvinyl alcohol/polyvinyl acetate copolymer.
[3] Polyethylene glycol having an average molecular weight of about 400.
[4] Polyethylene glycol having an average molecular weight of about 300.
[5] Polyvinyl acetate/polymethacrylic acid copolymer having a carboxyl group D.S. of about 1% hydrolyzed to the listed OH D.S.

The resultant casings are similar to that of Example 1. Resins of D.S.'s (OH) of at least 95% produced the best casings.

Example 12

A sample of the plasticized polyvinyl alcohol resin mixture described in Example 2 is extruded at about 200° C. as a flat softened film having a thickness of about 20 mils and the resultant film is then pressed into and through a web of 15-lb. Dexstar long fiber hemp paper by passage of the film and web in face-to-face contact between the nip of two rolls having chilled (10° C.) chrome surfaces as shown in FIG. 2 and described above. The resultant resin impregnated and coated web has a continuous polyvinyl alcohol resin film thickness of about 10 mils. The resultant sheet is slit to a six inch width and then passed through cross-linking agent bath 52 comprising an aqueous solution of 1% dimethylol urea and 0.2% lactic acid. The treated sheet then is formed into a continuous tube in a seaming operation using an aqueous solution comprising 10% polyvinyl alcohol/ polyvinyl acetate copolymer (OH group D.S., 98%; viscosity, 10 cps.), 2% glycerol, 1% formaldehyde, and 0.2% lactic acid as the adhesive. After setting of the seaming adhesive, curing and cross-linking of the resin in the casing is completed in heater 59 at temperatures ranging up to 140° C.

The resultant casing which is formed does not tend to break across the seam when subjected to routine tensile tests and otherwise has properties similar to those of the preceding examples.

Examples 13–15

The procedure of Example 12 is repeated excepting 30% acetone solutions of each toluene diisocyanate, butadiene diepoxide, and the diketene of dimerized linoleic acid, are substituted as the seaming adhesive.

The resultant casings obtained have strength and break properties similar to those of the casing of Example 12.

The paper used in the above examples was a long fiber hemp paper. In general, however, similar results are obtained by substituting in the processes of the examples any saturating tissue or nonwoven or woven web of suitable strength. In some cases, a small amount of a surfacant or wetting agent may be added in a preliminary treatment to aid thorough penetration of the polyvinyl alcohol resin into the web.

In the general examples given above, the polyvinyl alcohol resin is provided with either formaldehyde or dimethylol urea as a cross-linking agent. Similar results, however, are obtained by substituting in the processes of the examples any of the other polyvinyl alcohol resin cross-linking agents specifically listed herein above.

The casings produced in the processes of the above examples are essentially clear. Similar processes, however, can be utilized in the production of colored casings. Such colored casings, for example, may be produced by incorporating F.D.A. and U.S.D.A. approved pigments in bath 29 or bath 52 in the above-described techniques. In particular, aluminum lake pigments of F.D.A. approved food dyes may be used. The invention further embraces the addition to the polyvinyl alcohol resin film coating of minor amounts, e.g., up to about 20% by weight, of other film-forming resins, e.g., polyvinyl acetate, amylose, etc., provided such resins are compatible with the polyvinyl alcohol resin and extrusion conditions utilized.

The tubular casings produced in accordance with this invention are useful primarily for processing and packaging sausages such as bologna, etc. These casings may also be used for packaging food and other products. The casings are also useful as semipermeable membranes for purification of water by reverse osmosis and as hemodialysis membranes in artifical kidney machines.

Other embodiments which do not depart from the spirit and scope of the present invention, of course, will be apparent to those skilled in the art. Accordingly, it will be understood the present invention is to be limited only by the scope of the appended claims.

What is claimed is:

1. A method of preparing a synthetic sausage casing comprising saturating and coating a long fiber saturating tissue with a melt-extruded film of a plasticized, film-forming polyvinyl alcohol resin having a degree of substitution with regard to hydroxyl groups of at least 60% and a degree of polymerization of at least about 800 to deposit and insolubilize the polyvinyl alcohol resin as a continuous film in and on said saturating tissue, and, before, during, or after said resin insolubilization step, forming at least a portion of the sheet material obtaining in the process into a tube having a longitudinally extending and adhesively bonded seam.

2. The method of preparing a synthetic sausage casing according to claim 1 wherein said saturating tissue is in the form of a tube when impregnated and coated by said melt-extruded polyvinyl alcohol resin.

3. The method of preparing a synthetic sausage casing according to claim 1 wherein said insolubilized resin film-saturated and coated tissue is a flat sheet and at least a portion of said flat sheet subsequently is formed into a tube having a longitudinally extending and adhesively bonded seam.

4. The method of preparing a synthetic sausage casing according to claim 1 wherein said melt-extruded polyvinyl alcohol resin film contains up to 40 parts by weight of a plasticizing agent per 100 parts said resin and the resultant plasticized resin is essentially moisture-free and melts substantially uniformly at a temperature below about 220° C.

5. The method of preparing a synthetic sausage casing according to claim 1 wherein said polyvinyl alcohol resin after being coated onto said saturating tissue, is reacted with a cross-linking agent.

6. The method of preparing a synthetic sausage casing according to claim 1 wherein said deposited polyvinyl alcohol resin is characterized by a degree of substitution with regard to hydroxyl groups in the range of from about 95% to about 99.99% and a degree of polymerization of at least about 800 and is a polyvinyl alcohol/polyvinyl ester copolymer or a carboxylated polyvinyl alcohol/ polyvinyl ester resin having a degree of substitution with regard to carboxyl groups ranging up to about 0.5%.

7. The method of preparing a synthetic sausage casing according to claim 6 wherein said saturating tissue is in the form of a tube when impregnated and coated by said melt-extruded polyvinyl alcohol resin.

8. The method of preparing a synthetic sausage casing according to claim 6 wherein said insolubilized resin film-saturated and coated tissue is a flat sheet and at least a portion of said flat sheet subsequently is formed into a tube having a longitudinally extending and adhesively bonded seam.

9. The method of preparing a synthetic sausage casing according to claim 6 wherein said melt-extruded polyvinyl alcohol resin film contains up to 40 parts by weight of a plasticizing agent per 100 parts said resin and the resultant plasticized resin is essentially moisture-free and melts substantially uniformly at a temperature below about 220° C.

10. The method of preparing a synthetic sausage casing according to claim 6 wherein said polyvinyl alcohol resin, after being coated onto said saturating tissue, is reacted with a cross-linking agent.

References Cited

UNITED STATES PATENTS 2,210,436    8/1940    Weingand      99—176
2,251,296    8/1941    Shipp      260—91.30 A (Additional references on following page)

UNITED STATES PATENTS

| | | | |
|---|---|---|---|
| 2,408,682 | 12/1944 | Porter | 161—247 |
| 2,993,825 | 7/1961 | Gage | 161—88 X |
| 3,061,458 | 10/1962 | Arguette | 260—91.30 A |
| 3,262,905 | 7/1966 | Martins | 260—45.7 P |
| 3,348,997 | 10/1967 | Lagully | 260—91.30 A |
| 3,505,264 | 4/1970 | Thoese | 260—91.3 UA |
| 3,516,960 | 6/1970 | Martins | 99—176 X |

FOREIGN PATENTS

| | | | |
|---|---|---|---|
| 386,161 | 1/1933 | Great Britain | 99—176 |
| 486,296 | 5/1938 | Great Britain | 117—94 |

FRANK W. LUTTER, Primary Examiner

R. HALPER, Assistant Examiner

U.S. Cl. X.R.

161—247; 260—91.3 UA